Oct. 28, 1952

G. H. BRODIE 2,615,997

TELEPHONE REPEATER

Filed Dec. 13, 1946

3 Sheets-Sheet 1

INVENTOR:
GEORGE H. BRODIE

BY [signature]

ATTORNEY

Oct. 28, 1952 G. H. BRODIE 2,615,997

TELEPHONE REPEATER

Filed Dec. 13, 1946 3 Sheets-Sheet 2

INVENTOR:
GEORGE H. BRODIE
BY [signature]
ATTORNEY

Oct. 28, 1952 G. H. BRODIE 2,615,997

TELEPHONE REPEATER

Filed Dec. 13, 1946 3 Sheets-Sheet 3

INVENTOR:
GEORGE H. BRODIE
BY [signature]
ATTORNEY

Patented Oct. 28, 1952 2,615,997

UNITED STATES PATENT OFFICE 2,615,997

TELEPHONE REPEATER

George H. Brodie, La Grange, Ill., assignor, by mesne assignments, to Kellogg Switchboard and Supply Company, a corporation of Delaware Application December 13, 1946, Serial No. 716,054

6 Claims. (Cl. 179—170)

This invention relates to telephone repeaters. Its principal object is the provision of a new and improved two-way telephone repeater so arranged that simple two-winding repeating coils may be employed to interconnect it with the two line sections between which it is to repeat, and to interconnect it with the balance networks associated with such line sections.

As is well known, a long two-way telephone line is severed at one or more desired points, and a two-way telephone repeater is inserted between the two sections of the line at each such point to amplify the attenuated voice currents to the desired extent. Such a repeater contains a separate amplifying channel for each of the two directions of conversation. In order to prevent the amplified voice currents passing through the repeater in one direction from being returned, amplified, to the initial line section by way of the other channel, it is common practice to employ a balance network for each line section, and to employ a so-called hybrid coil to join each line section and associated balance network with the two channels of the repeater. Such a coil commonly has five separate windings including four which must be nicely balanced amongst themselves, in that they are connected in series between the line section and the balance network in order to provide a pair of connections representing the neutral points of these windings. These so-called hybrid coils have generally proven to be quite expensive to produce, because of the large number of windings which must be maintained in substantial balance. Alternative arrangements have been tried with some success, including the use of two or more interconnected repeating coils to replace a hybrid coil, but all such arrangements have generally been found to be open to the objection that they do not provide the desired economy of production. The present invention obviates the foregoing difficulties by providing a two-way telephone repeater which employs two pairs of simple two-winding repeating coils serving within the repeater arrangement to prevent the undesired local signal circulation referred to as singing so long as the respective two-winding repeating coils of each pair are substantial equivalents of each other.

An outstanding feature of the invention relates to the arrangement included in each channel for amplifying and repeating voice currents, incoming over a line section, equally to the opposite line section and to the balance network associated therewith, and for insuring that the resulting voice currents flowing from the last named section back toward the original section are canceled by an equal and opposite flow arising from the amplified and repeated voice currents transmitted to the concerned balance network. In accordance with this feature, a phase inverter, consisting preferably of a vacuum-tube amplifier adjusted for zero amplification, is employed in one of two opposed paths to invert the phase of the amplified voice currents returned thereover.

Other objects and features of the invention, subordinate for the most part to the foregoing, will appear upon a further perusal of the description.

The accompanying drawings, comprising Figs. 1 to 6, show in circuit diagram, and in block diagram, a preferred embodiment of the invention and desirable modifications thereof:

Figure 1:
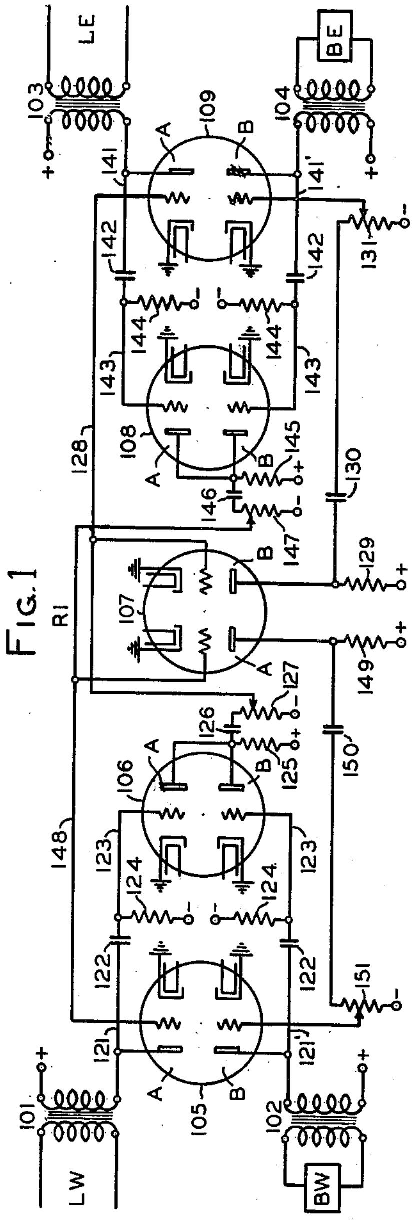
Fig. 1 is a circuit diagram of a two-way repeater embodying the invention in its preferred form.
Figure 2:
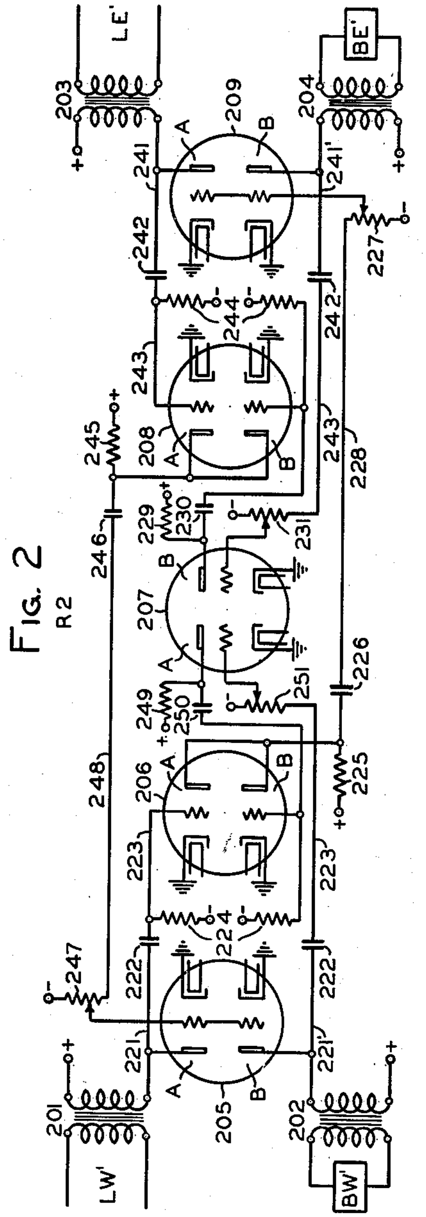
Fig. 2 is a similar diagram of a two-way repeater embodying the invention in one modified form.
Figure 3:
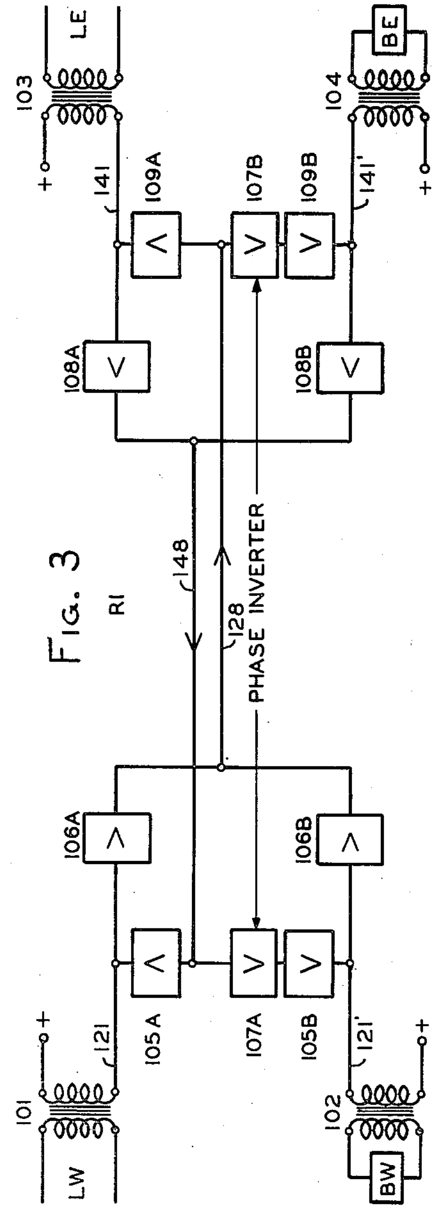
Fig. 3 is a block diagram of the repeater apparatus of Fig. 1.
Figure 4:
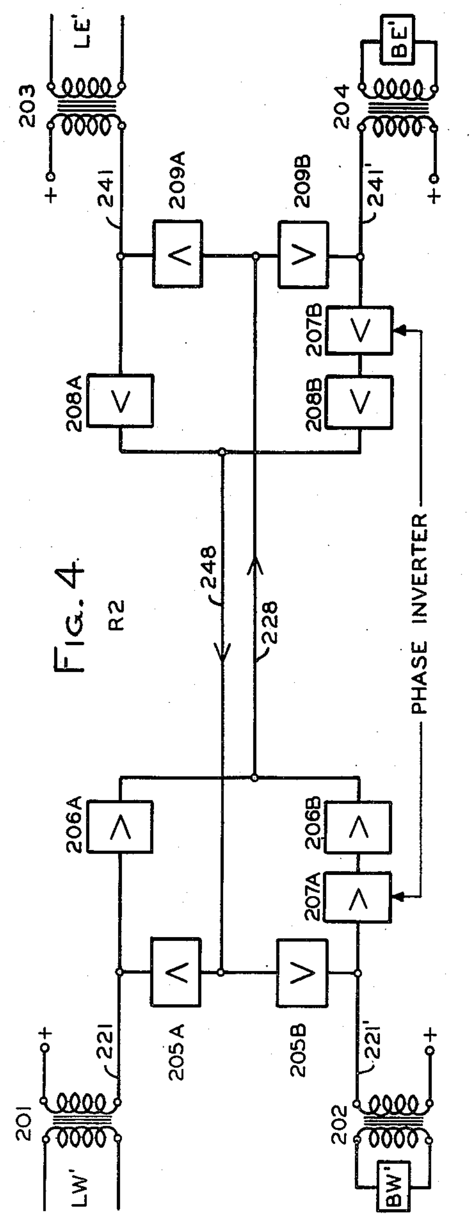
Fig. 4 is a block diagram of the repeater apparatus of Fig. 2.
Figure 5:
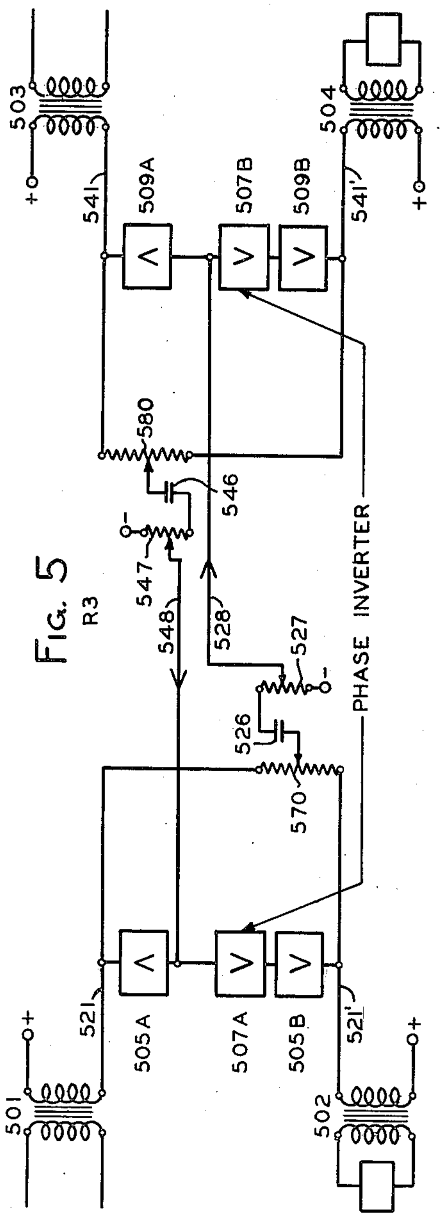
Figs. 5 and 6 are block diagrams of further modifications.
Figure 6:
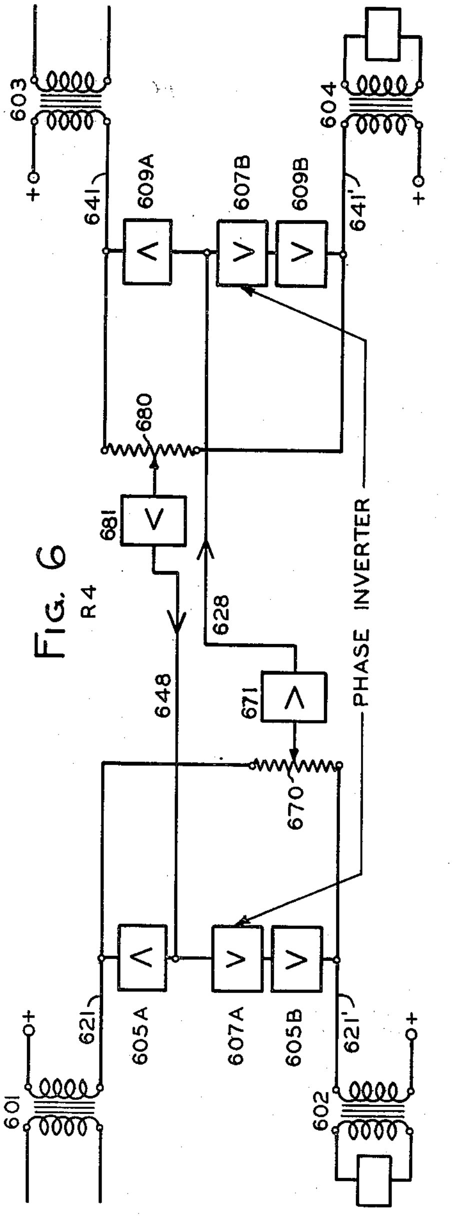

The preferred form of repeater, Figs. 1 and 3, is referred to as R1. The modified form of repeater of Figs. 2 and 4, is referred to as R2, and the further modified forms of Figs. 5 and 6 are referred to as R3 and R4.

*Preferred embodiment; Figures 1 and 3*

Referring first to the repeater R1 of Figs. 1 and 3, this repeater is interposed between two sections LW and LE of a two-way telephone line (usually a long-distance line or trunk). Section LW is coupled to conductor 121 of the repeater by way of repeating coil 101, and section LE of the line is coupled to conductor 141 of the repeater by way of repeating coil 103.

Balance networks BW and BE (sometimes referred to as artificial lines) are associated respectively with line sections LW and LE. Each such section may comprise the usual impedance elements arranged in the usual manner to provide substantially an electrical equivalent of its associated line section.

Referring now particularly to Fig. 3, voice currents arriving over line section LW reach conductor 121 through repeating coil 101, and pass through amplifier 106A, conductor 128 and amplifier 109A to reach conductor 141, whence they reach line section LE by way of repeating coil 103. Similarly, voice currents arriving over line section LE are amplified and repeated to line section LW by passing through repeating coil 103 to reach conductor 141, whence they pass through amplifier 108A, conductor 148, and amplifier 105A to conductor 121, thence to line section LW by way of repeating coil 101.

The remaining parts of repeater R1 are those concerned with preventing feed-back, or singing, between the two oppositely directed amplifying channels represented by conductors 148 and 128 respectively. The arrangement for preventing amplified voice currents from returning (feeding back) from conductor 141 to conductor 121, incident to their passage from section LW to section LE, includes balance network BE repeating coil 104 and associated parts 107B, 109B, 108B, and conductor 141. Part 107B is a phase inverter, such as vacuum-tube amplifier adjusted for zero amplification, while parts 109B and 108B are amplifiers similar respectively to amplifiers 109A and 108A.

When voice currents pass over conductor 128 toward line section LE, by way of amplifier 109A and conductor 141, such voice currents pass also through phase inverter 107B and thence through amplifier 109B, to reach conductor 141' in direct phase opposition to the voice currents reaching conductor 141. The voice currents passing over conductor 141 to reach line section LE are modified in accordance with the electrical characteristics of such line section. On the other hand, the voice currents passing over conductor 141' to reach the associated balance network BE are similarly modified, with the result that the voice currents on conductors 141 and 141' may be exactly similar except that they are in direct phase opposition by virtue of the action of phase inverter 107B. Consequently, the amplified voice currents passing to return conductor 148 from conductor 141, by way of amplifier 108A, are exactly neutralized by the similar, out-of-phase voice currents passing from conductor 141' through amplifier 108B to conductor 148. Consequently, the net effect on conductor 148 is zero when all the concerned parts are in balance.

A similar arrangement prevents outgoing voice currents traversing conductor 121, on their way to line section LW, from feeding back over conductor 128 to conductor 141. It includes phase inverter 107A, amplifiers 105B and 106B, conductor 121', repeating coil 102, and balance network BW, associated with line section LW.

At this point it may be noted that an exact balance is not required, and that it is permissible for a certain amount of voice currents to be returned over either of the conductors 148 and 128, so long as such returned voice currents are of a power substantially lower than the initial voice currents, whereby local oscillation (singing) is avoided. The considerations in this respect are similar to those surrounding two-way telephone repeaters of the prior art. The required degree of balance against intolerable amounts of returned energy is generally in proportion to the amount of gain required through a channel of the repeater. General considerations usually limit the allowable gain to about ten decibels, which represents a maximum increase in power through an amplifying channel of 10 to 1, or a voltage increase of slightly in excess of 3 to 1.

Referring now to Fig. 1, it shows a suitable circuit arrangement for carrying out the previously described arrangement shown in block-diagram form in Fig. 3. The amplifiers and phase inverters of Fig. 3 appear in Fig. 1 as five double-triode vacuum tubes 105 to 109. The two triodes of any such tube are separately identified as parts A and B thereof. For example, amplifiers 105A and 105B of Fig 3 include respectively parts A and B of double triode tube 105 of Fig. 1.

Each of the triodes of Fig. 1 includes a grounded cathode indirectly heated by the indicated heating element. The circuit arrangement for the heaters is not shown as it forms no part of the invention. The circuit arrangement of Fig. 1 further requires a grounded source of positive potential for the plates (anodes) of the triodes, and a grounded source of negative potential for biasing the grids (control electrodes) of the triodes to the desired point. These two grounded sources are not shown, but the connections to them are indicated by terminals marked according to the polarity of the source.

Plate current is supplied to the two triodes of tubes 105 and 109 through the local windings of repeating coils 101 to 104. Plate current is supplied to the two triodes of tube 106 through common resistor 125, and to the two triodes of tube 108 through similar resistor 145. Plate current is supplied to triodes A and B of phase inverter tube 107 through resistors 149 and 129.

Biasing potential is supplied to the two triodes of tube 106 through grid resistors 124 and to tube 108 through similar resistors 144. Biasing potential is supplied to triode B of tube 107 and to triode A of tube 109 by way of the slide arm of potentiometer 127 and conductor 128, potentiometer 127 being employed as a gain-control device through which the gain in signals passing from section LW to section LE is adjusted. Biasing potential is similarly supplied to section A of tubes 105 and 107 through the slide arm of gain-control potentiometer 147 and conductor 148, device 147 being adjustable according to the gain desired in signals passing from section LE to section LW.

Biasing potential is supplied to triodes B of tubes 105 and 109 through the slide arms of potentiometers 151 and 131 respectively. Such potentiometers are adjustable to secure the desired state of zero amplification through each of the triodes A and B of phase-inverter tube 107.

The plates of tube 105 are connected respectively to the grids of tube 106 through coupling condensers 122; coupling condensers 142 serve similarly between tubes 109 and 108. Coupling condenser 126 is located between the plates of tube 106 and gain-control potentiometer 127. Condenser 146 is similarly interconnected between tube 108 and potentiometer 147. Condensers 130 and 150 interconnect sections B and A of phase-inverter tube 107 respectively with potentiometers 131 and 151.

Signals arriving on conductor 121 from line section LW traverse the associated condenser 122 and conductor 123 to reach triode A of tube 106, passing thence by way of potentiometer 127, to conductor 128. From conductor 128, such signals pass through triode A of tube 109 to reach conductor 141, whence they pass through repeating coil 103 to line section LE. The signals on conductor 128 also pass through triode B of phase-inverter tube 107, passing thence through condenser 130, potentiometer 131, triode B of tube 109, whence they reach balance network BE by way of repeating coil 104. Having passed through phase-inverter triode B of tube 107, the signals on conductor 141' are in direct phase opposition to those on conductor 141. Signals from these two conductors proceed through condensers 142 and conductors 143 through both triodes of tube 108. The plate current variations in either triode of tube 108 are accordingly exactly offset by plate current variations in the other triode thereof, whereby no net change in plate current results. Accordingly, no return signal passes through condenser 146 to conductor 148.

Similarly, signals arriving on conductor 141 from line section LE reach triode A of tube 108 through the associated condenser 142 and conductor 143, passing thence through condenser 146, gain-control potentiometer 147, conductor 148, triode A of tube 105, to conductor 121, passing thence to line section LW by way of repeating coil 101. The signals on conductor 148 also reach conductor 121' by way of triode A of phase-inverter tube 107, condenser 150, potentiometer 151, and triode B of tube 105, thence reaching balance network BW by way of repeating coil 102. The signals on conductor 121' are in direct phase opposition to those on conductor 121, with the result that equal and opposing signals are impressed through condensers 122 and conductors 123 on the grids of sections A and B of tube 106, resulting in no net change in plate current of that tube, wherefore no resulting return signal reaches conductor 128.

It may be noted that potentiometer 131, for example, while provided primarily to adjust the associated triode B of phase-inverter tube 107 to zero amplification, this potentiometer is not necessarily adjusted to the exact zero-gain point in the event that the two triodes of tube 109 possess slightly unequal amplifying properties. Potentiometer 131 is adjusted in any event to cause the opposed potentials appearing on conductors 141 and 141' to be equal, except that they may be slightly unequal to further compensate for any amplifying unequality which exists between the two elements of tube 108. It is clear therefore that potentiometer 131 should be adjusted to give the same gain through triodes B of tubes 107, 109, and 108 as is realized through triodes A of tubes 109 and 108. Similarly, potentiometer 151 should be adjusted to provide the same gain through triode A of tube 107 and triodes B of tubes 105 and 106 as is realized through triodes A of tubes 105 and 106.

In Figs. 1 and 3, with phase inverters 107B and 107A located respectively between conductor 128 and the input of amplifier 109B, and between conductor 148 and the input of amplifier 105B, the potentials applied by the repeater to conductors 141 and 141' are out of phase with each other, as are the potentials applied by the repeater to conductors 121 and 121'. Consequently, an increase in current flow through the local winding of repeating coil 103 is accompanied by a corresponding decrease in current flow through the local winding of repeating coil 104. The same condition exists with respect to the local windings of repeating coils 101 and 102. Accordingly, the arrangement of Figs. 1 and 3 is such as to cause a minimum of change in plate current incident to operation, reducing the tendency for cross talk between repeaters incident to poor voltage regulation of a common source of plate-current supply.

The nature of the repeater arrangement being described is such that either line section is interchangeable with its associated balance network. For example, line section LW may be attached to the terminals of the line winding of repeating coil 102, and balance network BW may be attached to the terminals of line winding of repeating coil 101. If such a transposition is made, signals impressed on conductor 148 from line section LE reach line section LW by way of element A of tube 107 and element B of tube 105 directly out of phase with equal signals reaching balance network BW by way of element A of tube 105. Also, with this transposition made, signals arriving over section LW pass through repeating coil 102 to reach conductor 121', whence they pass by way of section B of tube 106 to reach conductor 128 on their way toward line section LE.

*Second embodiment; Figures 2 and 4*

Repeater R2 of Figs. 2 and 4 is similar to repeater R1 of Figs. 1 and 3, except that the phase inverters occupy a different position within the latter arrangement.

In-phase signals are impressed on conductors 221 and 221', and on conductors 241 and 241', in that phase inverters 207A and 207B are located beyond conductors 241' and 221'. These phase inverters are located respectively between such conductors and the input of amplifiers 208B and 206B. Accordingly, the in-phase currents are changed to out-of-phase currents in the output circuits of the pairs of amplifiers comprising 206A and 206B, and 208A and 208B. The net result is that signals repeated to conductor 241 by the repeater R2 are prevented from returning over conductor 248, and signals repeated by the repeater to conductor 221 are prevented from returning to conductor 228, but alterations in current flow over conductor 221 are accompanied by similar in-phase alterations of similar flow over conductor 221', the same existing with respect to conductors 241 and 241'. Accordingly, a better voltage regulation of a common power supply is required with the arrangement of Figs. 2 and 4 than is required with the arrangement of Figs. 1 and 3.

Referring now particularly to the circuit diagram of the repeater R2 as shown in Fig. 2, line sections LW' and LE' correspond respectively to line sections LW and LE associated with the repeater R1; balance networks BW' and BE' correspond respectively to balance networks BW and BE; repeating coils 201 to 204 correspond respectively to repeating coils 101 to 104; and tubes 205 to 209 correspond respectively to tubes 105 to 109. The remaining elements of Fig. 2 correspond to elements of Fig. 1, each such element having applied thereto a reference numeral beginning with the digit 2 rather than with the digit 1.

It will be noted that signals incoming from line section LW' pass by way of conductor 221, triode A of tube 206, conductor 228, and potentiometer 227 to the two grids, in parallel, of triodes A and B of output tube 209, causing equal in-phase currents to flow in conductors 241 and 241'. The signals represented by these conductors are accordingly transmitted equally to line section LE' and to its associated balance network BE'. Such signals also pass through condensers 242 and conductors 243 to reach triodes A and B of tube 208. The signals from conductor 241 reach triode A of this tube directly, while the signals from conductor 241' reach triode B of tube 208 through triode B of phase inverter tube 207, whereby the resulting plate-current change in triode B is directly out of phase with that in triode A of tube 208. Potentiometer 231, located between conductor 241' and the input of phase-inverter triode B of tube 207 is so adjusted that the out-of-phase plate currents in triodes A and B of tube 208 are equal, whereby no resulting return signal reaches conductor 248.

The signals incoming from line section LE' to conductor 241 pass similarly over conductor 248 to reach line section LW' by way of conductor 221, accompanied by equal signals on conductor 221'. The latter signals having their phase inverted through section A of tube 207 to reach section B of tube 206 directly out of phase with the signals reaching section A of this tube from conductor 221, whereby no resulting signal is fed back to conductor 228.

*Third embodiment; Figure 5*

The third embodiment of the invention, repeater R3 of Fig. 5, is similar to the first embodiment except that amplifiers 106A and 106B have been replaced by center-tapped resistor 570, and amplifiers 108A and 108B have been replaced by the similar resistor 580. Each such resistor may be provided with a fixed center tap, or a slide-arm connection may be employed, as indicated, to permit adjustment to the point of minimum feed-back.

Incoming signals reaching conductor 521, by way of repeating coil 501, pass through the upper section of resistor 570, coupling condenser 526, and gain-control device 527, to reach conductor 528. From this point, such signals divide, one portion passing through amplifier 509A to reach conductor 541, associated with the outgoing line section, the other portion passing through phase inverter 507B and amplifier 509B to reach conductor 541', associated with the outgoing balance network. Such signals accordingly reach conductors 541 and 541' in direct phase opposition, applying equal and opposite potentials to the two terminals of resistor 580. Being connected to the mid point of resistor 580, conductor 548 is unaffected by these potentials, wherefore return feed-back of the outgoing signal is prevented.

Similarly, incoming signals arriving on conductor 541 by way of repeating coil 503, pass through the upper section of resistor 580, coupling condenser 546, and gain-control device 547, to reach conductor 548. Such signals pass toward the opposite line section through amplifier 505A and conductor 521, at the same time proceeding toward the associated balance network by way of phase inverter 507A, amplifier 505B, and conductor 521'. The equal and opposite potential variations on conductors 521 and 521' cause a current to flow through both sections of resistor 570, but conductor 528 remains unaffected because connected to the center point of the resistor.

The arrangement of Fig. 5 is particularly useful where the gross gain required in either direction can be supplied by a single amplifier 505A or 509A, keeping in mind that the signal suffers a loss in potential on the order of one-half in the passing through a center-tapped resistor 570 or 580.

*Fourth embodiment; Figure 6*

The fourth embodiment of the invention, repeater R4 of Fig. 6, is similar to the third embodiment shown in Fig. 5 except that amplifiers 671 and 681 are inserted in conductors 628 and 648 respectively. The arrangement of Fig. 5 is thus modified to provide two tandem-related stages of amplification for each direction of signal transmission, permitting simple triode tubes to be employed to obtain any net gain through the repeater likely to be required. It will be noted that condenser 526 and gain control potentiometer 527 are not separately shown in Fig. 6. They may be considered as incorporated within amplification stage 671. The same applies to the oppositely directed amplification stage 681.

With respect to any of the disclosed repeaters R1 to R4, if desired, one of the balance networks associated therewith may be omitted, along with its associated phase inverter and amplifying apparatus, without rendering the repeater liable to "sing" or "howl," provided a particularly exact balance obtains between the remaining balance network and its associated line section, and between the channel branch containing the remaining phase inverter and the opposed channel branch. For example, considering repeater R1 as shown in Fig. 3, balancing network BW may be omitted, along with repeating coil 102, phase inverter 107A, and amplifiers 105B and 106B. With this removal accomplished, signals arriving over line section LW proceed as before over conductor 121, through amplifier 106A, and thence over conductor 128 to reach conductors 141 and 141' in direct phase opposition, whereby the amplified signals transmitted to section LE are prevented from returning over conductor 148 to the originating line section as previously described. On the other hand, signals arriving over line section LE and traversing conductors 141 and 148 to reach conductor 121 (amplified by amplifiers 108A and 105A), pass to section LW as before, but are returned, through amplifier 106A to conductor 128, whence they reach conductor 141 by way of amplifier 109A, considerably amplified with respect to their initial passage over conductor 141. The returning signals also pass from conductor 128, through phase inverter 107B, and amplifier 109B, reach conductor 141' directly out of phase with their appearance on conductor 141, and equally amplified. These greatly amplified, returned signals pass through amplifiers 108A and 108B to reach conductor 148 as equal and opposed potentials, wherefore they are mutually canceled at that point to prevent further propagation thereof. The foregoing abbreviated arrangement, while not recommended for most purposes, may nevertheless be of utility under certain circumstances.

I claim:

1. In a two-way telephone repeater for interconnecting a first section and a second section of a two-way telephone line, a balance network associated with said second section, circuit apparatus providing a first amplifying channel for transmitting amplified signals from the first section to the second section, and providing a second amplifying channel for transmitting amplified signals from the second section to the first, the first channel having a pair of output branches leading therefrom respectively to the second line section and its associated balance network, the second channel having a pair of input branches leading thereto respectively from the second line section and its associated balance network, the second line section and its balance network each providing a junction for an output branch of one channel and an input branch of the other channel, and a phase inverter serially related to one of said four branches.

2. In a two-way telephone repeater for interconnecting two sections of a two-way telephone line, balance networks associated with said line sections respectively, circuit apparatus providing two oppositely directed amplifying channels for transmitting amplified signals between the sections, each channel having a pair of similar input branches leading thereto respectively from a line section and from its associated balance network, each channel having a pair of similar output branches leading therefrom respectively to the other line section and to its associated balance network, each line section, and each balance network, thus providing a junction for an output branch of one channel and an input branch of the other channel, and means for inverting the phase of the signals traversing one of the four said branches associated with each line section with respect to the signals in the other branch of its said pair to prevent local signal circulation through the two channels serially.

3. A two-way amplifier system comprising two bridge networks, each network consisting of two impedance elements in adjacent arms and two amplifier tubes in the other two arms of the bridge, a signal input circuit asymmetrically connected across one diagonal defined by the junction points of each element and a tube, and a signal output circuit asymmetrically connected across the other diagonal and to the input of one amplifier tube of the second network.

4. A two-way amplifier comprising a first and a second Wheatstone bridge, each bridge having an amplifying tube in each of two adjacent arms and balancing impedance elements in the remaining arms, a two-way signal circuit coupled across the diagonal of each bridge defined by the apices between the tubes and impedance elements, the other diagonal of each bridge being coupled across the input of one tube of the opposite bridge.

5. In the two-way amplifier defined in claim 4, each of said two-way signal circuits positioned asymmetrically in the coupled diagonal with respect to the electrical center of the diagonal.

6. In the two-way amplifier defined in claim 4, each of the first mentioned diagonals including the winding of a signal transformer and a series impedance element, the junction of the winding and the series element being fixed at a grounding potential with respect to the remainder of the bridge.

GEORGE H. BRODIE.

REFERENCES CITED

The following references are of record in the file of this patent:

UNITED STATES PATENTS

| Number | Name | Date |
|---|---|---|
| 1,353,637 | Crisson | Sept. 21, 1920 |
| 2,002,499 | Black | May 28, 1935 |
| 2,004,598 | Bjornson | June 11, 1935 |
| 2,106,337 | Black | Jan. 25, 1938 |
| 2,229,806 | Holzler | Jan. 28, 1941 |
| 2,258,275 | Black | Oct. 7, 1941 |

FOREIGN PATENTS

| Number | Country | Date |
|---|---|---|
| 501,234 | Great Britain | Feb. 23, 1939 |
| 103,041 | Sweden | Sept. 18, 1941 |